3,326,682
COLOR-PROOFING FOILS

Fritz Endermann, Wiesbaden, and Fritz Uhlig, Wiesbaden-Biebrich, Germany, assignors to Kalle Aktiengesellschaft, Wiesbaden-Biebrich, Germany, a corporation of Germany No Drawing. Filed Nov. 30, 1964, Ser. No. 414,859
Claims priority, application Germany, Dec. 3, 1963, K 51,524, K 51,525
2 Claims. (Cl. 96—23)

The present invention relates to color-proofing foils, and refers more particularly to methods and materials for making color-proofing foils from light-sensitive materials.

It is known in color printing that color-proofing foil may be produced from a colored original by color-separation silver films which are respectively made by exposure of the original through blue, red, and yellow filters to produce an appropriately-colored image on transparent foil and to place the three color-proofing foils in registration in order to obtain an indication of the appearance of the color print to be made.

Color-proofing foils are sometimes produced from a transparent foil coated with a diazonium salt and a coupler, the exposed material being subjected to ammonia vapor so as to produce a colored azo dye in the unexposed areas. This process has not proved very satisfactory because the color of the azo dye formed varies considerably with the concentration of the ammonia atmosphere.

It has also been proposed in U.S. Patent 2,993,788 that a plastic film which has been presensitized with a naphthoquinone diazide be exposed under a blue-color separation original, treated to remove the light decomposition product from the image areas of the film by treatment with an alkaline solution, colored to dye the bared parts of the film with a blue dye, and treated to remove the diazo coating from the non-image areas. This procedure requires the film to be again sensitized, exposed under a yellow color separation original, developed in the same manner, and dyed yellow; after which it must again be sensitized, exposed under a red color separation original, developed and dyed red. This procedure is undesirable in view of the necessity for repeated sensitizing of film.

Foils sensitized with silver have also been used for the purpose, but this involves a gelatin sub-coating containing an oxidizing agent and, in the silver halide coating, a dispersed dye coupler which diffuses into the sub-coating in the image areas to form a dye there. Although this process works with visible light, it is not economical because of the cost of silver halide and its radioactive sensitivity. Also, it involves the disadvantage of requiring two superposed coatings.

Therefore, one object of the present invention is to provide methods and materials for making color-proofing foils, which overcome the disadvantages of the prior art.

Another object is to provide novel light-sensitive materials for making color-proofing foils.

Other objects will become apparent in the course of the following specification.

The present invention provides a light-sensitive material for making a color-proofing foil, which comprises a substantially transparent plastic film carrying a light-sensitive coating containing an o-naphthoquinone diazide and a dye which is fast to alkali and is soluble in organic solvents.

The present invention includes methods for using the light-sensitive material to make a color-proofing foil which comprises exposing the material under a color separation silver film original, and developing the resulting image by treatment with an aqueous alkaline liquid.

Preferably the image is again exposed to light after development to decompose the light-sensitive diazide remaining in the image areas.

The dyes must not only be fast to alkali and soluble in organic solvents, but they must conform with the standard yellow, blue and red used in color-proofing. A standardized black is also frequently required. Preferably the colors of the dyes correspond to those of DIN Color Chart 16,508. Examples of such dyes are Fat Yellow 5G (C. Suppl. 572), Fat Yellow 3G (C. 2822), Fat Red G (C. 2843), Fat Red HRR, Fat Red 5B (C. 2851), Fat Black HB (C. 2899), Zapon Fast Black RE (C. Suppl. 121), Zapon Fast Black B (C. Suppl. 121), Zapon Fast Blue HFL (C. 2880), Zapon Fast Blue FLE (C. Suppl. 593), Zapon Fast Red BB (C. 2864), Zapon Fast Red BE (C. 2845), Zapon Fast Fire Red B (C. Suppl. 583), Zapon Fast Red GE (C. Suppl. 584), Zapon Fast Yellow G (C. 2827), Zapon Fast Yellow GR (C. 2823), and mixtures thereof.

The numbers prefixed by the letter "C" which appear after the names of the dyes denote the relevant page number in the Color Index, Part I, Second Edition 1956. The numbers prefixed by "C. Suppl." which appear after the names of the dyes denote the page numbers in the Color Index, Part I, Second Edition, Supplement 1963. Fat Red HRR is an azo dye of the empirical formula $C_{22}H_{16}N_4O$ produced by coupling of one mole of p-aminoazobenzene with one mole of beta-naphthol. Other dyes which are fast to alkali and soluble in organic solvents may be used provided their colors conform to the standard color charts used in countries other than Germany.

The light-sensitive o-naphthoquinonediazide and the dye are dissolved in an organic solvent or a mixture of organic solvents. The resulting coating solution is applied to the film support by any conventional method and then dried.

The concentration of the dye in the coating solution is normally 0.1% to 5%, and preferably 1% to 3% by weight of the total weight of the solution. The proportion by weight of o-naphthoquinonediazide to dye is normally in range of 1:0.1 to 1:5 and preferably 1:0.5 to 1:2. Examples of suitable organic solvents are glycol ethers, such as glycolmonomethyl ether and glycolmonoethyl ether, esters such as butyl acetate and amyl acetate, ethers such as dioxane, ketones such as methylethyl ketone and cyclohexanone, and dimethylformamide.

Resins, plasticizers, activators and other customary additives may be included in the coating but such additives are not normally required.

The plastic film utilized as the support should be dimensionally stable under the conditions of the process, and the preferred material is a polyester film, such as polyethylene terephthalate. However, cellulose acetate, polyvinyl chloride, and polyalkylene films, such as polyethylene and polypropylene, may also be used. The film may be subjected to pretreatment in order to improve the adhesion of the coating.

Each of the dried presensitized foils, which are intensely colored by the dye applied to them, are exposed to ultraviolet light under a screened color separation silver film positive which has been produced in a copying camera from a colored original. The color separation used corresponds to the color of the presensitized film; that is, the yellow film is exposed under the yellow silver film separation, the red film under the red silver film separation, and so on.

After exposure, the light decomposition product and the dye are removed from the non-image areas by treatment with a weekly alkaline solution, which normally contains 0.5 to 5% by weight of an alkaline substance. Examples are alkali metal silicates, alkali metal phosphates, alkali metal carbonates, and organic bases such as ethanolamines, alkylamines, and alkylene diamines. The developed films are dried. When they are superimposed in precise register a colored image is obtained which either corresponds exactly to the multicolored original or, alternatively, renders possible a rapid correction of the silver films by any of the conventional after-treatments.

The main advantage of the process according to the invention is that the expensive and time-consuming machine proofing hitherto necessary can be dispensed with in offset, gravure and relief printing. Secondly, a quick impression of the color to be expected after printing can be gained. Corrections then can be made without stopping a printing run in progress.

A conventional procedure for the reproduction of a colored original in offset, gravure and relief printing consists in taking three or four successive exposures of an original provided with registration marks on film coated with a silver halide emulsion through a screen in a copying camera. The first exposure is made, for example, through a blue filter, the second through a yellow filter and a third through a red filter. The fourth exposure, if required is made without a filter. After development of the films, color separation silver films are obtained, each of which serves as an original for the exposure of a light sensitive printing plate. After development, the resulting printing plates correspond to the four color separation silver film originals and can be used for printing in a color printing machine.

The exposure of the printing plates must be carried out very carefully in order to insure proper registration in the printing machine with the material which is to be printed.

The highest accuracy of register is achieved by the use of a blue foil, which acts as a so-called registration guide and which is an image of the original in which the image areas are blue and non-image areas are uncolored. The foil is dyed with a blue dye of low actinic density; that is, one which is transparent to light, but is nevertheless clearly visible. The blue foil is used as a registration key during exposure of the printing plates by bringing the color separation silver film originals successively to register with the blue foil by the aid of registration marks, generally in the form of crosses, on all color separation films and on the blue foil, or by bringing the edges of the images into register.

An uncoated transparent foil may also be laid over the blue foil and color separation silver film originals successively positioned in register therewith. When the originals are so mounted, the printing plates are exposed in precise register. This insures precise registration during printing on the printing machine.

The invention includes the use of an exposed and developed transparent or substantially transparent plastic film as a registration guide in color printing. The film is presentized with an o-naphthoquinonediazide and a blue dye of a low actinic density which is fast to alkali and soluble in organic solvents.

Examples of suitable blue dyes are Zapon Fast Blue HFL (C. 2880), Zapon Fast Blue FLE (C. Suppl. 593), Zapon Fast Violet RR (C. 2867), Zapon Fast Blue 3G (C. 1639) and Sudan Blue II (C. 2883).

The coated film is exposed to light under a diapositive produced from the original and preferably one of the screened color separation silver film positives carrying register marks and prepared in a copying camera from the colored original.

After exposure, the light-decomposition product and the dye are removed from the non-image areas by treatment with a weakly alkaline solution as described above.

The blue colored image obtained after drying is used as a registration guide by separately bringing each color separation silver film original successfully into alignment with the blue foil (for example on an illuminated table) and exposing the printing plates through the resulting respective assemblies to a powerful source of light. If desired an uncoated transparent foil may be placed over the blue foil and alignment may be effected either with the aid of the registration mark present on all the color separations and on the blue foil, or with the aid of the image edges.

The following examples further illustrate the present invention and are not intended to limit its scope.

EXAMPLE 1

One gram of 4-[naphthoquinone-(1,2)-diazide-(2)-sulfonyloxy-(5)]-2,3-dihydroxy - benzophenone (prepared as described in German Patent No. 938,233, Example 1), 1.5 grams of Zapon Fast Blue HFL and 0.5 gram of Sudan Blue II were dissolved in 68 grams of glycol monomethylether, 17 grams of butyl acetate, and 15 grams of cyclohexanone, and a roll of polyester film of 50 microns thickness was coated with this solution by roller application.

After drying in a heated tunnel the roll was cut into suitable sizes. When stored in the dark, the resulting blue-colored presensitized film had a shelf life of many months. To produce a dye image, the film was exposed to a 60 ampere arc lamp for three minutes at a distance of 110 centimeters under a screened blue separation silver film positive taken in a copying camera through a blue filter. The coating was removed from the film in the non-image areas by wiping over with a pad of cotton-wool soaked with an aqueous solution containing 2.4% sodium silicate, 1.5% sodium triphosphate, and 0.3% sodium dihydrogen phosphate. The film was then washed with water and dried. It was advantageous then to expose the film again to light without the original in order to bleach out the light-sensitive o-naphthoquinonediazide in the image areas. A positive, storable, blue-colored image of the silver film original was thus obtained. The color of this image corresponded to that of the standard blue according to DIN 16,508.

EXAMPLE 2

One gram of 1-[naphthoquinone-(1,2)-diazide-(2)-sulfonyloxy-(5)]-3,5-dihydroxy - benzene (prepared as described in German Patent No. 1,109,521, Example 1) and two grams of fat yellow 5G were dissolved in 97 grams of glycol monomethyl ether, and a polyester film of thickness 50 microns was coated with this solution as described in Example 1.

The yellow-colored film was exposed under the corresponding yellow separation silver film positive, developed by treatment with a solution of 5% triethanolamine and 20% glycol in water, washed and dried.

A positive, yellow-colored image of the silver film original was obtained, the color of which corresponded to that of the standard yellow according to DIN 16,508.

EXAMPLE 3

One gram of 2'-[naphthoquinone-(1,2)-diazide-(2)-sulfonyloxy - (5)]-dihydroxy-(3',4')-benztropolone (prepared as described in German Patent No. 1,124,817, Example 1) and 0.5 gram of Zapon Fast Red BB were dissolved in 97 grams of glycol monomethyl ether. With this solution a red-color film was prepared as described in Example 1 and exposed under the corresponding red separation silver film positive. The color of the image corresponded to that of the standard red according to DIN 16,508.

EXAMPLE 4

One gram of 2,2'-bis-[naphthoquinone-(1,2)-diazide-(2) - sulfonyloxy - (5)] - dinaphthyl - (1,1') - methane (prepared as described in German Patent No. 865,109, Example 6), 0.2 gram of a phenol formaldehyde novolac and one gram of Fat Black HB were dissolved in the solvent specified in Example 1 and a black-colored image was produced as in Example 1.

When the colored images produced in accordance with Examples 1 to 4 were superposed in exact register, a duplicate with failthful color reproduction was formed.

EXAMPLE 5

A blue-colored foil was prepared as described in Example 1.

The blue-colored film was exposed to a 60 ampere arc lamp for three minutes at a distance of 110 centimeters under a screened separation silver film positive prepared in the copying camera with the use of a filter. The coating was removed from the non-image areas by wiping over with a pad of cotton-wool soaked with a solution in water of 2.4% sodium silicate, 1.5% sodium triphosphate and 0.3% sodium dihydrogen phosphate. The film was then washed with water and dried. It bore a blue-colored image of the original carrying the usual registration marks.

A yellow separation silver film positive of the original which was produced under a yellow filter in a copying camera, was mounted on this blue-colored foil so that the registration marks, or the image edges of the film and foil, coincided. The assembly was placed on a light-sensitive printing plate and exposed to an arc lamp. After development the printing plate was used for printing with yellow printing ink on a conventional color printing machine.

The assembly consisting of the blue registration guide and the yellow separation was taken apart and the procedure repeated successively with the red separation silver film positive, the blue separation silver film positive, and, if a four-color print is intended, with the diapositive of the multicolored original which was obtained without a color filter.

As an alternative, a similar registration guide may be used in which the coating contains instead of 4-[naphthoquinone - (1,2) - diazide - (2) - sulfonyloxy-(5)]-2,3-dihydroxy-benzophenone, approximately the same amount of 4-[naphthoquinone-(1,2)-diazide-(1)-sulfonyloxy-(6)]-dihydroxy-(1,2)-anthraquinone and instead of the mixture of Zapon Fast Blue HFL and Sudan Blue II approximately the same amount of Zapon Fast Blue FLE.

It is apparent that the described examples are capable of many variations and modifications. All such variations and modifications are to be included within the scope of the present invention.

What is claimed is:

1. A method of color proofing a color separation transparency which comprises:
(a) providing a light-sensitive sheet comprising:
(1) a support, and
(2) a light-sensitive coating on said support comprising an intimate mixture of a light-sensitive o-naphthoquinone diazide and an alkali-fast dye of a basic color selected from the group of yellow, blue and red colors which match the primary colors of printing inks;
(b) exposing said sheet to actinic light through a color separation original;
(c) contacting the coating of the sheet so exposed with a weakly alkaline aqueous solution; and
(d) washing the coating to remove the coated composition from the light-struck areas; whereby a colored dye image of said original remains on said support.

2. A method of proofing separation transparencies of a multicolor original which comprises:
(a) providing a first light-sensitive sheet comprising:
(1) a transparent support, and
(2) a light-sensitive coating on said support, said coating comprising an intimate mixture of a light-sensitive o-naphthoquinone-diazide and an alkali-fast dye of a basic color selected from the group consisting of standard yellow, blue, and red colors used in color proofing and corresponding to a first basic color of said original;
(b) exposing said first sheet to actinic light through the separation transparency corresponding to said first basic color of said original;
(c) providing a second light-sensitive sheet comprising:
(1) a transparent support, and
(2) a light-sensitive coating on said support, said coating comprising an intimate mixture of a light-sensitive o-naphthoquinonediazide and an alkali-fast dye of a basic color selected from the group consisting of standard yellow, blue, and red colors used in color proofing and corresponding to a second basic color of said original;
(d) exposing said second sheet to actinic light through the separation transparency corresponding to said second basic color of said original;
(e) contacting the coatings of the sheets so exposed with a weakly alkaline aqueous solution;
(f) washing the coatings so contacted to remove the coated compositions from the light-struck areas whereby colored images of the corresponding separation transparency images remain on the respective sheets; and
(g) overlaying the washed sheets in registration according to the proper registry of said separation transparencies.

References Cited

UNITED STATES PATENTS

| | | | |
|---|---|---|---|
| 2,993,788 | 7/1961 | Straw et al. | 96—13 |
| 3,046,121 | 7/1962 | Schmidt | 96—91 |
| 3,106,465 | 11/1963 | Neugebauer et al. | 96—91 |
| 3,130,047 | 4/1964 | Uhlig et al. | 96—33 |
| 3,180,733 | 4/1965 | Neugebauer et al. | 96—33 |
| 3,201,239 | 8/1965 | Neugebauer et al. | 96—91 |
| 3,211,553 | 10/1965 | Ito | 96—33 |

NORMAN G. TORCHIN, *Primary Examiner.*

J. RAUBITSCHEK, *Assistant Examiner.*